United States Patent [19]

Kooi et al.

[11] Patent Number: 4,498,837

[45] Date of Patent: Feb. 12, 1985

[54] FORK LIFTER COMPRISING A SLIDABLE FORK

[75] Inventors: Hessel Kooi, TA Stiens; Sjoerd Meijer, St. Jacobiparochie, both of Netherlands

[73] Assignees: Selectiebedrijf Kooi Beheer B.V., Vrouwenparochie; Machine- en Constructiewerkplaats Meijer, St. Jacobiparochie, both of Netherlands

[21] Appl. No.: 233,435

[22] Filed: Feb. 11, 1981

[30] Foreign Application Priority Data

Feb. 19, 1980 [NL] Netherlands ........................ 8001006

[51] Int. Cl.[3] ............................................ B65G 47/00

[52] U.S. Cl. .................................. 414/664; 187/9 R; 92/161.5

[58] Field of Search ............... 187/9 R, 9 E; 414/630, 414/631, 664, 663, 668, 659, 660, 785, 662; 211/43, 193; 92/146, 161, 161.5; 212/184, 267, 268; 52/111, 115, 121

[56] References Cited

U.S. PATENT DOCUMENTS

| | | | |
|---|---|---|---|
| 1,243,900 | 10/1917 | Tyler | 92/146 |
| 1,955,744 | 4/1934 | Huffman | 92/146 |
| 2,536,068 | 1/1951 | Lehmann | 414/664 |
| 2,819,811 | 1/1958 | Quayle | 414/785 |
| 2,973,878 | 3/1961 | Gibson | 414/664 |
| 3,202,242 | 8/1965 | Dolphin | 187/9 R |
| 3,561,628 | 2/1971 | Melin | 414/664 |
| 4,294,572 | 10/1981 | Pattison | 414/664 |

FOREIGN PATENT DOCUMENTS

| | | | |
|---|---|---|---|
| 1044712 | 11/1958 | Fed. Rep. of Germany . | |
| 1093729 | 11/1960 | Fed. Rep. of Germany . | |
| 1910603 | 1/1970 | Fed. Rep. of Germany . | |
| 1051860 | 1/1954 | France . | |
| 902898 | 8/1962 | United Kingdom | 414/664 |
| 1246525 | 9/1971 | United Kingdom . | |

*Primary Examiner*—H. Grant Skaggs
*Assistant Examiner*—Kenneth Noland
*Attorney, Agent, or Firm*—Diller, Ramik & Wight

[57] ABSTRACT

A fork lifter comprising a mobile frame, a pole arranged on the frame and a load carrier adapted to move up and down along the pole and having a fork protruding from the pole, the prongs of the fork being provided with extensible parts wherein the extensible parts are driven by at least two cylinder-plunger combinations accommodated in the prongs of the fork and being located in a substantially horizontal plane.

6 Claims, 6 Drawing Figures

FORK LIFTER COMPRISING A SLIDABLE FORK

Figure 1:
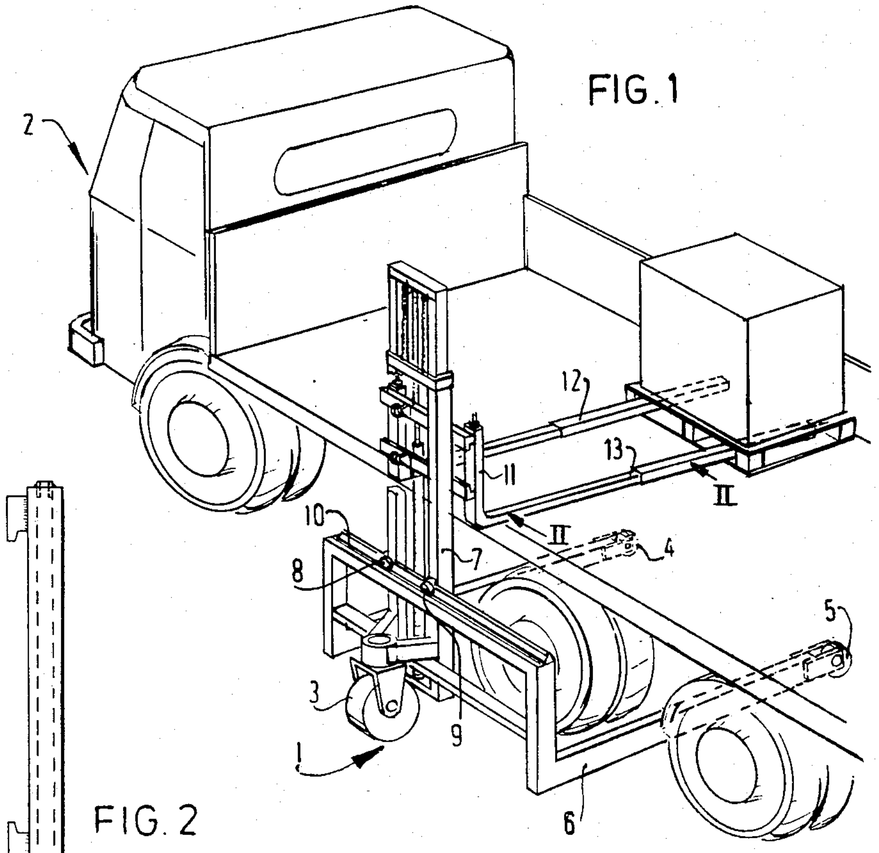

The invention relates to a fork lifter comprising a mobile frame, a pole arranged on said frame and a load carrier adapted to move up and down along said pole and having a fork extending away from the pole, the prongs of the fork being provided with extensible parts.

In order to be able to pick up, for example, load boards, the fork, particularly a fork having extensible prongs, should have limited thickness. In general it can be stated that in practice it is desirable for the prongs of a fork to be as thin as possible. This is, of course, subject to limitations. In the first place the prongs of the fork must have a given strength, whilst furthermore the means driving the extensible parts require space.

The invention has for its object to provide a fork lifter, the prongs of which have extensible parts and adequate strength for carrying a load, whilst the driving means can produce sufficient force for displacing the load.

According to the invention this is achieved by driving said extensible parts by means of at least two cylinder-piston combinations accommodated in the prongs of the fork and located in a substantially horizontal plane.

Since the driving force is generated by at least two cylinder-piston combinations adequate pressure is built up, whilst nevertheless the sectional area of each cylinder remains limited to an extent such that the thickness of the prongs remains comparatively small. The thickness can be further reduced when the cylinders are formed by bores in the prongs of the fork. Since the prongs need not accommodate a separate cylinder, the space occupied by the cylinder is limited. Then the prongs may be made from solid material.

The ducts for the supply and drainage of pressure medium may be formed by bores in the prongs. The sectional area of the ducts may be smaller than that of the cylinders.

The invention will be described more fully with reference to the accompanying drawing of one embodiment.

The drawing shows in

Figure 2:
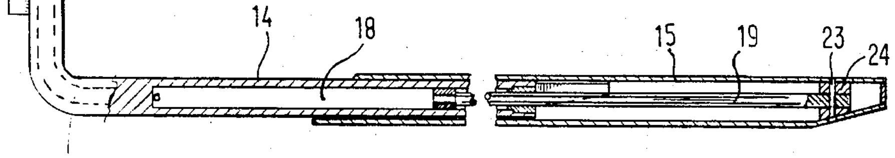
Figure 3:
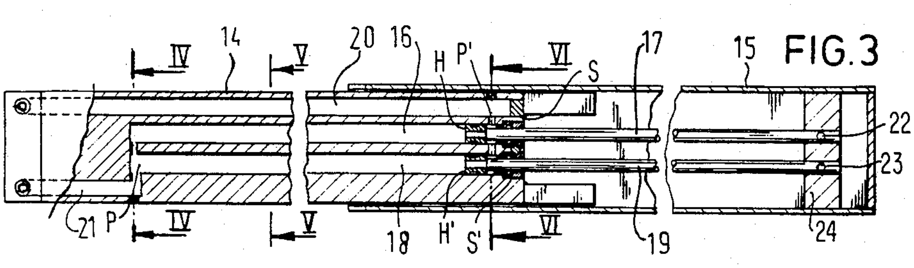
Figure 4:
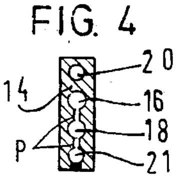
Figure 5:
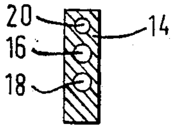
Figure 6:
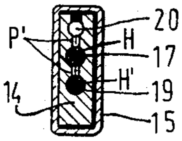

FIG. 1 a perspective view of a fork lifter in accordance with the invention, for lifting a load from a van, FIG. 2 a sectional view taken on the line II—II in FIG. 1, FIG. 3 a plan view and partly a sectional view of a prong of the fork lifter in accordance with the invention and FIGS. 4,5 and 6 sectional views taken on the lines IV-13 IV, V—V and VI—VI respectively in FIG. 3.

By means of the fork lifter 1 (see FIG. 1) the van 2 can be loaded and unloaded from one side. The fork lifter 1 comprises a frame 6, which is mobile on wheels 3,4 and 5, and a pole 7 arranged on the frame 6 and being movable on rollers 8,9 along the rail 10 of the frame in a transverse direction. A load carrier 11 having a protruding fork with two prongs 12 and 13 is adapted to move up and down along the pole 7. The prongs of the fork shown are formed by solid prongs 14, around which a tube is telescopically slidable. The outermost tube 15 carries the load. The tube is extensible and retractable with the aid of two cylinder-piston combinations comprising a cylinder 16 with the associated piston 17 and a cylinder 18 with the associated piston 19 respectively. The cylinders 16 and 18 are formed by bores in the solid material of the prong. The pressure medium is fed and drained through ducts 20 and 21 respectively. By dividing the driving force of the extensible parts among at least two cylinder-plunger combinations the thickness of the prong and hence that of the extensible part can be kept within limits. In the curve or the web of the fork only a small amount of material is removed by boring, since at this area only the pressure medium ducts are located.

As shown in FIG. 4, the cylinder bores 16 and 18 are communicated with each other and with the duct 21 by the transverse bore or passage P at the left-hand end (as viewed in FIG. 3) of the cylinders 16 and 18. As shown in FIG. 6, the cylinder bores 16 and 18 are communicated with each other and with the duct 20 by the transverse bore or passage P' at the right-hand end of the cylinders 16 and 18. As shown in FIG. 3, the two pistons 17 and 19 are provided with enlarged head portions H and H' which are snugly slidable in the respective cylinders 16 and 18 whereas the remote ends of the pistons 17 and 19 are anchored by the pins 22 and 23 to the cross piece 24 fixed to the tube 15. The right-hand ends of the cylinders 16 and 18 are provided with respective seals S and S' which surround the pistons 17 and 19.

Thus, when fluid under pressure is applied to the duct 20 whereas the duct 21 is connected to drain, the piston heads H and H', and consequently the tube 15, will be moved toward the left as viewed in FIG. 3. By reversing the fluid connections to the ducts 20 and 21, the opposite direction of movement is imparted to the tube 15.

As noted hereinabove, the tube is extensible and retractable with the aid of two cylinder-piston combination 16/17 and 18/19. Thus, to extend the tube 15, pressurized fluid is fed in parallel to the piston/cylinders through the passage 21 while fluid is drained through the passage 20 and vice versa when the tube 15 is retracted. It will be appreciated that the piston/cylinders are never permitted to extend or retract to such positions as would block the supply or discharge ports between the cylinders 16,18 and the passages 20,21.

What we claim is:

1. A fork lifter comprising a mobile frame, a pole arranged on said frame and a load carrier adapted to move up and down along said pole and having a fork protruding from the pole, the fork having prongs provided with extensible parts and each of said prongs having a limited thickness so that the extensible parts likewise are as thin as possible in order to be slid beneath a load, said extensible parts being driven by at least two cylinder-plunger combinations accommodated in each of the prongs of the fork and being located in a substantially horizontal plane, said cylinder-plunger combinations being limited in sectional areas by said limited thickness of the prongs, and means for operating such combinations in unison to extend and retract said extensible parts.

2. A fork lifter comprising a mobile frame, a pole arranged on said frame and a load carrier adapted to move up and down along said pole and having a fork protruding from the pole, the fork having prongs of the fork being provided with extensible parts characterized in that said extensible parts are driven by at least two cylinder-plunger combinations accommodated in each of the prongs of the fork and being located in a substantially horizontal plane, said cylinders being formed by bores in the prongs.

3. A fork lifter as claimed in claim 2 characterized in that the duct for the supply and drainage of pressure medium are formed by bores in the prongs.

4. In a fork lift device having an upstanding pole and a fork movable upwardly and downwardly on said pole, the improvement wherein:

said fork comprises a pair of horizontally extending prongs having a predetermined vertical thickness and a transverse width which is substantially greater than said thickness whereby the transverse section of each prong is of rectangular profile;

a load-receiving outer tube slidably received on each prong for movement between a retracted position and an extended position wherein the tube projects well beyond the free end of its associated prong;

each prong having a plurality of cylinders extending longitudinally inwardly from the free end thereof, said cylinders being spaced apart in the width-wise direction of each prong and each being of a diameter less than said thickness of each prong whereby a large cross sectional area of cylinder bores in each prong is additively achieved without unduly encroaching upon the said thickness dimension of each prong;

the cylinders in each prong each having a piston associated therewith, each piston having an enlarged head at one end slidably received in an associated cylinder and having its opposite end anchored to the associated outer tube; and means for subjecting the cylinders adjacent the free ends of the prongs to fluid pressure while draining the opposite ends thereof, and vice versa, whereby selectively to retract and extend said outer tubes.

5. In a fork lift device as defined in claim 4 wherein said means comprises a pair of conduits formed in each prong.

6. A fork lifter comprising a mobile frame, a pole arranged on said frame and a load carrier adapted to move up and down along said pole and having a fork protruding from the pole, the fork having prongs of the fork being provided with extensible parts characterized in that said extensible parts are driven by at least two cylinder-plunger combinations accommodated in each of the prongs of the fork and being located in a substantially horizontal plane, ducts for the supply and drainage of pressure medium being formed by bores in the prongs.

* * * * *